(12) United States Patent
Cho et al.

(10) Patent No.: US 7,586,712 B2
(45) Date of Patent: Sep. 8, 2009

(54) METHOD OF AND APPARATUS FOR DETECTING ACTUATOR VIBRATION IN HARD DISC DRIVE, AND HARD DISC DRIVE WRITE CONTROL METHOD OF AVOIDING EFFECT DUE TO READ/WRITE HEAD VIBRATION

(75) Inventors: Hyung-Joon Cho, Seoul (KR); Jao-hyeong Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 57 days.

(21) Appl. No.: 12/003,846

(22) Filed: Jan. 2, 2008

(65) Prior Publication Data
US 2008/0212229 A1 Sep. 4, 2008

Related U.S. Application Data

(62) Division of application No. 11/069,560, filed on Mar. 2, 2005, now Pat. No. 7,333,285.

(30) Foreign Application Priority Data
May 29, 2004 (KR) .............................. 2004-38746

(51) Int. Cl.
*G11B 5/55* (2006.01)
(52) U.S. Cl. .................................. 360/78.01
(58) Field of Classification Search ........................ None
See application file for complete search history.

(56) References Cited

U.S. PATENT DOCUMENTS

| 5,777,815 | A | 7/1998 | Kasiraj et al. |
| 5,907,447 | A | 5/1999 | Yarmchuk et al. |
| 5,982,573 | A | 11/1999 | Henze |
| 6,417,983 | B1 | 7/2002 | Yatsu |
| 6,549,349 | B2 | 4/2003 | Sri-Jayantha et al. |
| 6,600,621 | B1 | 7/2003 | Yarmchuk |
| 6,735,033 | B1 * | 5/2004 | Codilian et al. ............... 360/60 |
| 6,950,274 | B2 | 9/2005 | Inaji et al. |
| 2001/0048570 | A1 | 12/2001 | AbouJaoude et al. |

FOREIGN PATENT DOCUMENTS

| JP | 2000-36164 | 2/2000 |
| KR | 1998-63213 | 10/1998 |
| KR | 2003-46336 | 6/2003 |

OTHER PUBLICATIONS

U.S. Appl. No. 11/069,560, filed Mar. 2, 2005, Hyung-joon Cho, et al., Samsung Electronics Co., Ltd., Suwon-si, Republic of Korea.

* cited by examiner

*Primary Examiner*—K. Wong
(74) *Attorney, Agent, or Firm*—Staas & Halsey LLP

(57) ABSTRACT

A method of and an apparatus for detecting an actuator vibration, and a hard disc drive write control method of avoiding an effect due to the actuator vibration. The method of detecting an actuator vibration includes: obtaining a specified number of position error signal (PES) samples while following a track; performing a time-frequency conversion on the specified number of PES samples; and detecting a magnitude of a conversion coefficient indicating a magnitude of an actuator vibration, in a specified frequency band.

9 Claims, 9 Drawing Sheets

METHOD OF AND APPARATUS FOR DETECTING ACTUATOR VIBRATION IN HARD DISC DRIVE, AND HARD DISC DRIVE WRITE CONTROL METHOD OF AVOIDING EFFECT DUE TO READ/WRITE HEAD VIBRATION

CROSS-REFERENCE TO RELATED APPLICATION

This application is a divisional of application Ser. No. 11/069,560 filed Mar. 2, 2005, now U.S. Pat. No. 7,333,285 and claims the priority benefits of Korean Patent Application No. 2004-38746, filed on May 29, 2004, in the Korean Intellectual Property Office, the disclosure of which is incorporated herein by reference.

BACKGROUND OF THE INVENTION

1. Field of the Invention

The present invention relates to a hard disc drive, and more particularly, to a method of and an apparatus for detecting an actuator vibration in a hard disc drive, and a hard disc drive write control method of avoiding effect due to a read/write head vibration.

2. Description of Related Art

A hard disc drive is a recording apparatus used for storing information. Typically, a hard disc drive includes one or more magnetic recording discs, and information is recorded on concentric tracks in the magnetic recording discs. The discs are loaded on a spindle motor to be rotated, and the information recorded on the magnetic recording discs is accessed by a read/write head installed on an actuator arm rotated by a voice coil motor (VCM). The VCM moves the head by rotating the actuator upon being excited by a current. The read/write head reads the information recorded on a surface of the disc by sensing a change of a magnetic field on the surface of the disc. To write data on tracks, a current is supplied to the head. The current generates a magnetic field, and the magnetic field magnetizes the surface of the disc.

A hard disc drive records/reproduces data in response to a command from a host system.

In the hard disc drive, it is preferable that data be exactly recorded along a center of a track. However, a head typically moves with drifting left and right along a center of a track due to being affected by a response characteristic of a tracking control circuit, inertia of an actuator, and bias conducted to the head. A degree of how far a head is apart from a track center, that is, an off-track, can be detected by a servo burst signal recorded on a servo sector area, and a signal indicating the magnitude of the off-track is commonly called a position error signal (PES).

When the off-track is severe, data recorded on a neighbor track may be erased by a write operation on a target track. Accordingly, in a conventional recording method, a write operation is performed only when a degree of the off-track, i.e., the magnitude of PES, is within a specified limit.

However, in the hard disc drive, it is known that an actuator vibrates according to a magnetic flux density distribution status of the VCM. In particular, since a magnetic flux density distribution of a one magnet VCM is not as even as that of a multi-magnet VCM, the actuator of the one magnet VCM can vibrate easily. This vibration tendency is usually larger in an inner disc zone rather than in an outer disc zone.

The actuator vibration according to the magnetic flux density distribution of the VCM has a unique frequency (however, the frequency is a little bit different according to a hard disc drive) and depends on a seek distance, i.e., a moving distance of the actuator to place a head on a target track, and a seek position, i.e., a position of the target track.

When the actuator vibrates, if the hard disc drive is controlled to record by relying on only the magnitude of PES like in a conventional method, a write operation may be unstable. That is, when the actuator vibrates, since an off-track component due to the vibration and an off-track component due to a drift according to a tracking operation are added, a probability that the PES exceeds a threshold value is higher. This tendency is maintained until the vibration of the actuator exceeds a permitted limit.

On the other hand, it is well known that the magnitude of a write current to the write head is changed according to an operational temperature of the hard disc drive. For example, since a coercive power of a disc increases in an operational environment at a low-temperature, the magnitude of the write current must be larger than in an operational environment at a high or normal temperature. If the actuator vibrates in the operational environment at a low-temperature, a write operation is unstable, and a probability that a neighbor track erase effect is generated is higher.

Therefore, it is preferable that a write operation be performed when the vibration of the actuator is reduced below a permitted limit.

BRIEF SUMMARY

An aspect of present invention provides a method of detecting whether an actuator vibrates or not and the magnitude of a vibration when the actuator vibrates in a hard disc drive.

An aspect of the present invention also provides a write control method of reducing a probability that a write operation is unstable or a neighboring track erase effect is generated by not performing the write operation when a vibration of an actuator in a hard disc drive is larger than a specified limit.

An aspect of the present invention also provides an apparatus using the actuator vibration detecting method.

According to an aspect of the present invention, there is provided a method of detecting an actuator vibration in a hard disc drive, including: obtaining a specified number of position error signal (PES) samples while following a track; time-frequency converting the specified number of PES samples; and detecting a magnitude of a conversion coefficient indicating a magnitude of an actuator vibration, in a specified frequency band.

The specified frequency band for detecting the magnitude of the actuator vibration may be 700-900 Hz.

According to another aspect of the present invention, there is provided a method of controlling a write operation of a hard disc drive, including: seeking a target track to perform the write operation; following the target track when the target track is reached; sequentially sampling position error signals (PES) obtained during the following; time-frequency converting the PES samples; comparing a magnitude of a conversion coefficient in a specified frequency band and a specified threshold value; and writing, when the magnitude of the conversion coefficient in the specified frequency band is smaller than the specified threshold value.

The method may further include determining, before the sampling, whether the target track is placed in an inner disc zone rather than a threshold position in which the actuator vibration starts, and when the target track is in an inner disc zone, performing the time-frequency converting and the comparing. The method may also include determining, before the sampling, whether the target track is placed in an inner disc zone rather than a threshold position in which the actuator vibration starts and whether a seek distance to the target track is longer than a threshold seek distance in which the actuator vibration starts, and when the target rack is in an inner disc zone and the seek track is longer than the threshold seek distance, performing the time-frequency converting and the comparing.

According to another aspect of the present invention, there is provided.

The apparatus may also include a counter detecting that a specified number of PES samples are buffered in the buffer; and an AND gate generating a signal enabling the fast Fourier transformer by AND operating a counted result of the counter and a track following mode signal.

Also, the apparatus may also include a comparator generating a signal indicating whether a write operation can be performed by comparing the magnitude of the specified frequency component provided by the fast Fourier transformer with a specified threshold value.

According to another aspect of the present invention, there is provided a method of preventing instability of a write operation, including: obtaining a specified number of position error signal (PES) samples while following a track; time-frequency converting the specified number of PES samples; and detecting a magnitude of a conversion coefficient indicating a magnitude of an actuator vibration, in a specified frequency band.

According to another aspect of the present invention, there is provided a computer-readable storage medium encoded with processing instructions for causing a processor to perform a method of detecting an actuator vibration in a hard disc drive, the method including: obtaining a specified number of position error signal (PES) samples while following a track; time-frequency converting the specified number of PES samples; and detecting a magnitude of a conversion coefficient indicating a magnitude of an actuator vibration, in a specified frequency band.

According to another aspect of the present invention, there is provided a computer-readable storage medium encoded with processing instructions for causing a processor to perform a method of detecting an actuator vibration in a hard disc drive, the method including: obtaining a specified number of position error signal (PES) samples while following a track; time-frequency converting the specified number of PES samples; and detecting a magnitude of a conversion coefficient indicating a magnitude of an actuator vibration, in a specified frequency band.

According to another aspect of the present invention, there is provided a computer-readable storage medium encoded with processing instructions for causing a processor to perform a method of controlling a write operation of a hard disc drive, the method including: seeking a target track to perform the write operation; following the target track when the target track is reached; sequentially sampling position error signals (PES) obtained during the following; time-frequency converting the PES samples; comparing a magnitude of a conversion coefficient in a specified frequency band and a specified threshold value; and writing, when the magnitude of the conversion coefficient in the specified frequency band is smaller than the specified threshold value.

Additional and/or other aspects and advantages of the present invention will be set forth in part in the description which follows and, in part, will be obvious from the description, or may be learned by practice of the invention.

BRIEF DESCRIPTION OF THE DRAWINGS

These and/or other aspects and advantages of the present invention will become apparent and more readily appreciated from the following detailed description, taken in conjunction with the accompanying drawings of which.

DETAILED DESCRIPTION OF EMBODIMENTS

Reference will now be made in detail to embodiments of the present invention, examples of which are illustrated in the accompanying drawings, wherein like reference numerals refer to the like elements throughout. The embodiments are described below in order to explain the present invention by referring to the figures.

Figure 1:
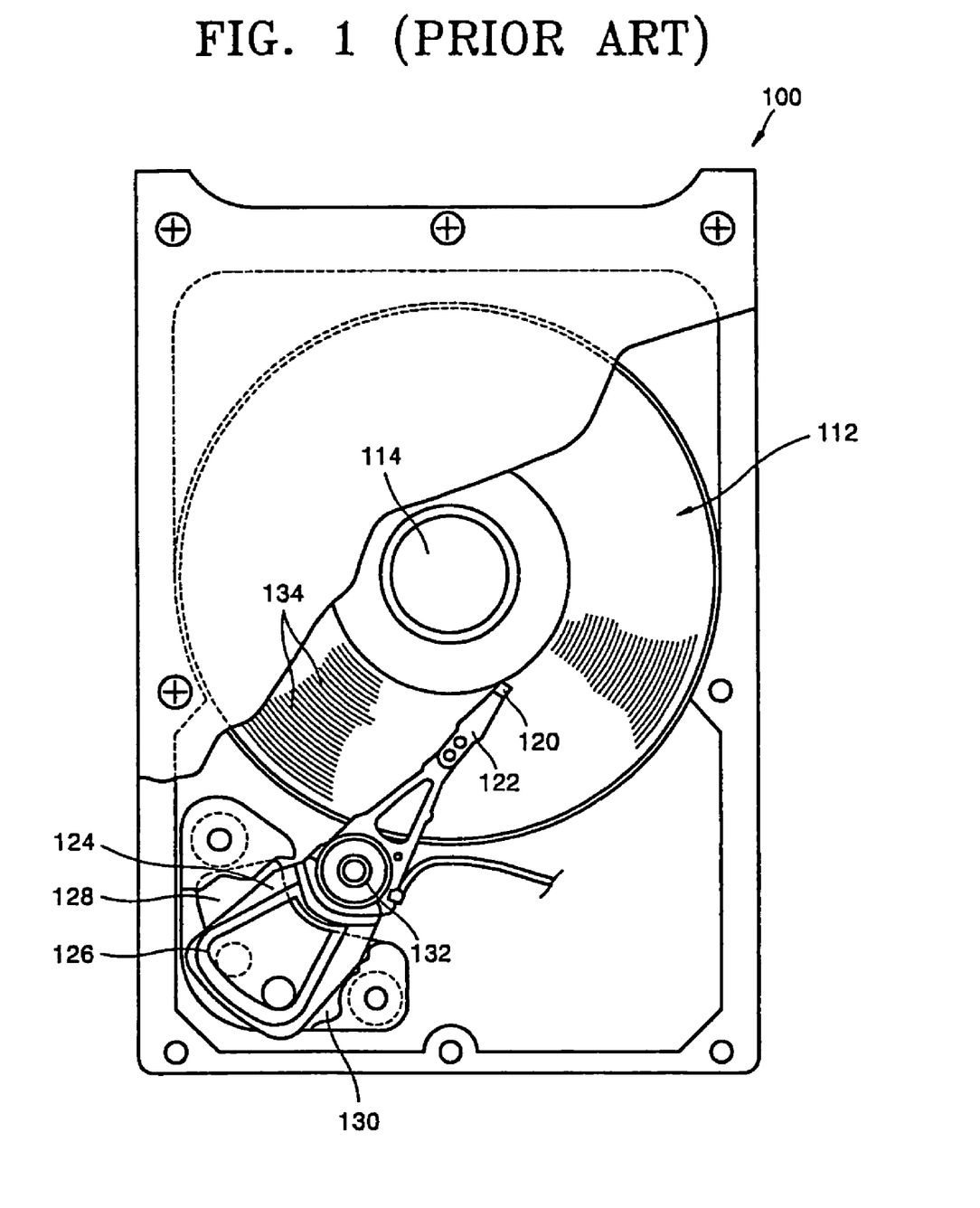
FIG. 1 illustrates a configuration of a conventional hard disc drive.

FIG. 1 illustrates a configuration of a conventional hard disc drive 100.

Referring to FIG. 1, the hard disc drive 100 includes at least one disc 112 rotated by a spindle 114 driven by a motor (not shown). The hard disc drive 100 also includes a head 120 adjacently located on a surface of the disc 112.

The head 120 can read or write information from or on the rotating disc 112 by sensing a magnetic field formed on the surface of the disc 112 or magnetizing the surface of the disc 112. Even though a single head 120 is shown in FIG. 1, the head 120 includes a write head magnetizing the disc 112 and a read head sensing a magnetic field of the disc 112.

The head 120 generates an air bearing between the head 120 and the surface of the disc 112. The head 120 is combined with a head stack assembly (HSA) 122. The HSA 122 is attached to an actuator arm 124 having a voice coil 126. The voice coil 126 is located adjacent to a magnetic assembly 128 specifying (supporting) a voice coil motor (VCM) 130. A current supplied to the voice coil 126 generates a torque rotating the actuator arm 124 against a bearing assembly 132. The rotation of the actuator arm 124 moves the head 120 across the surface of the disc 112.

Information is stored in concentric tracks of the disc 112. In general, the disc 112 includes a data zone in which user data is recorded, a parking zone in which the head 120 is parked when the hard disc drive 100 does not work, and a maintenance cylinder.

Figure 2:
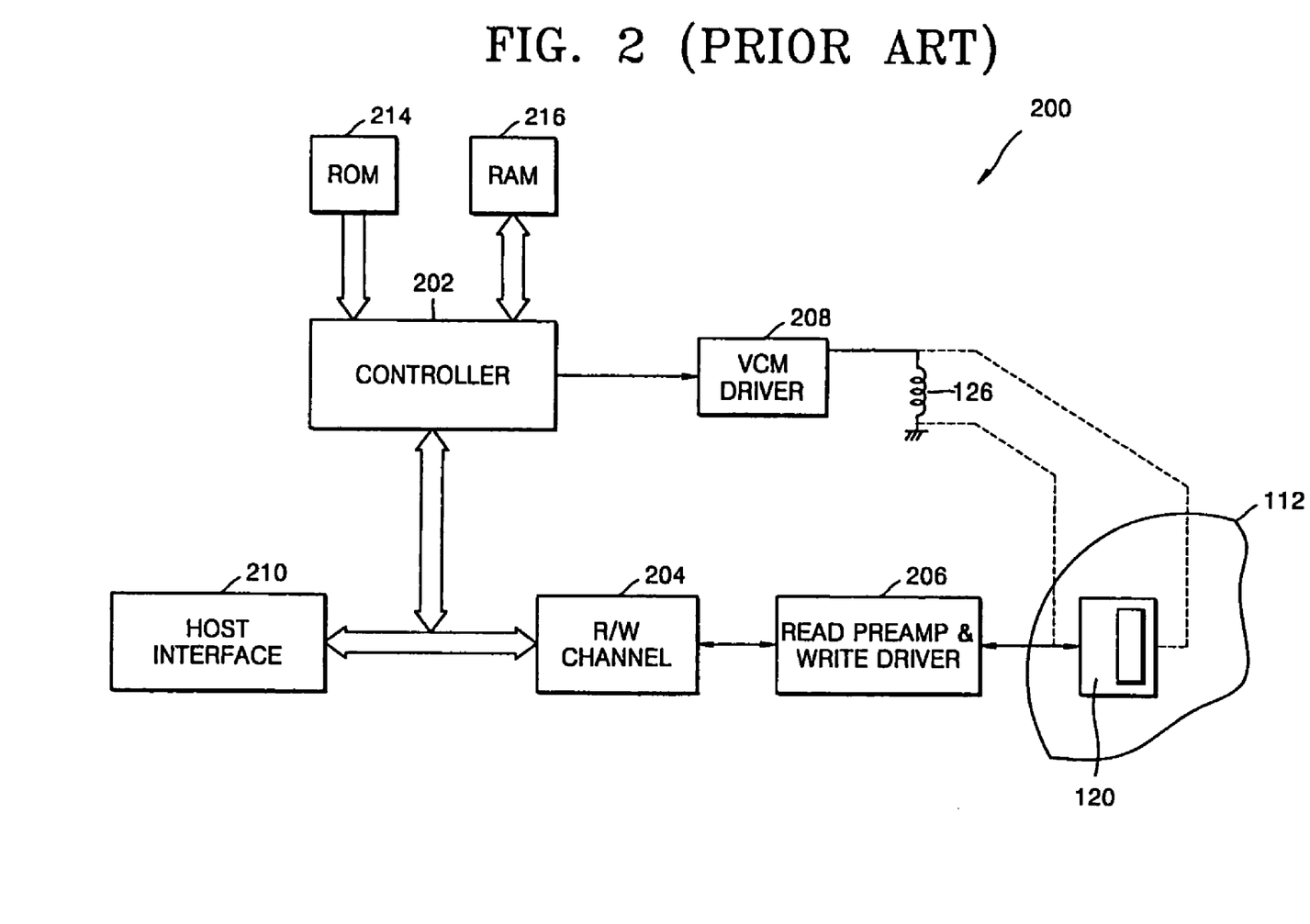
FIG. 2 is a block diagram of a control unit controlling the hard disc drive shown in FIG. 1.

FIG. 2 is a block diagram of a control unit 200 controlling the hard disc drive 100 shown in FIG. 1.

Referring to FIG. 2, the control unit 200 includes a controller 202 connected to the head 120 through a read/write (R/W) channel circuit 204 and a read preamp and write driver circuit 206. The controller 202 can be a digital signal processor (DSP), a microprocessor, or a micro controller.

The controller 202 provides a control signal to the R/W channel circuit 204 in order to read data from the disc 112 or write data on the disc.

Information is typically transmitted from the R/W channel circuit 204 to a host interface circuit 210. The host interface circuit 210 includes a control circuit interfacing to a system such as a personal computer (PC).

The R/W channel circuit 204 converts an analog signal read by the head 120 and amplified by the read preamp and write driver circuit 206 into a digital signal that a host computer (not shown) can read and outputs the digital signal to the host interface circuit 210 in a read mode. Also, the R/W channel circuit 204 receives user data from the host computer via the host interface circuit 210, converts the user data into a write current to write the user data on the disc 112, and outputs the write current to the read preamp and write driver circuit 206 in a write mode.

The controller 202 is also connected to a VCM driver 208 supplying a driving current to the voice coil 126. The controller 202 provides a control signal to the VCM driver 208 in order to control exciting of the VCM and moving of the head 120.

The controller 202 is also connected to a read only memory (ROM) 214 or a nonvolatile memory, such as a flash memory, and a random access memory (RAM) 216. The memories 214 and 216 stores commands and data used by the controller 202 for executing a software routine.

A control routine controlling a seek operation is included in the software routine.

Figure 3A:
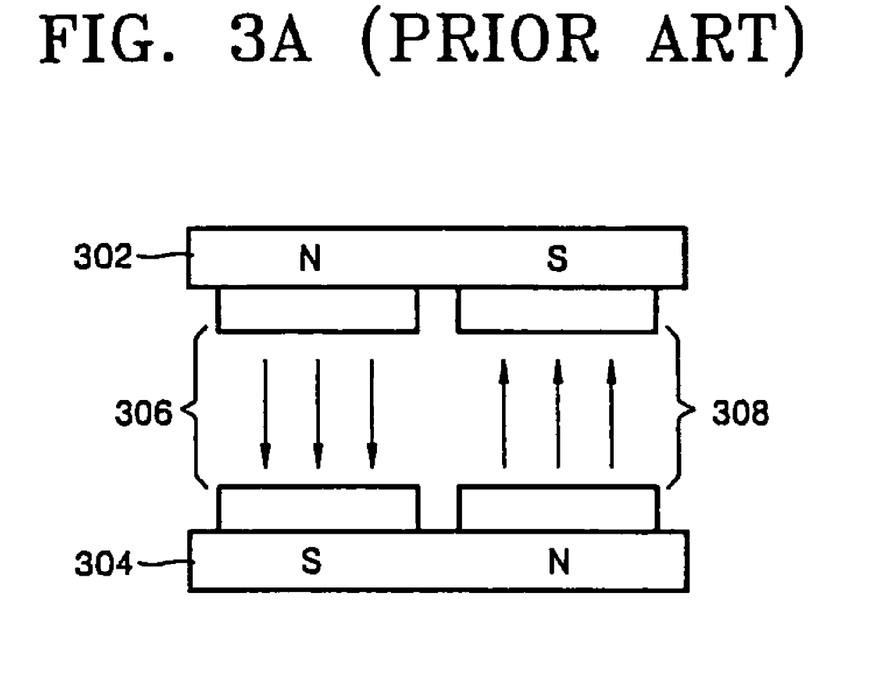
FIGS. 3A and 3B show yoke configurations of a multi-magnet VCM and a one magnet VCM.
Figure 3B:
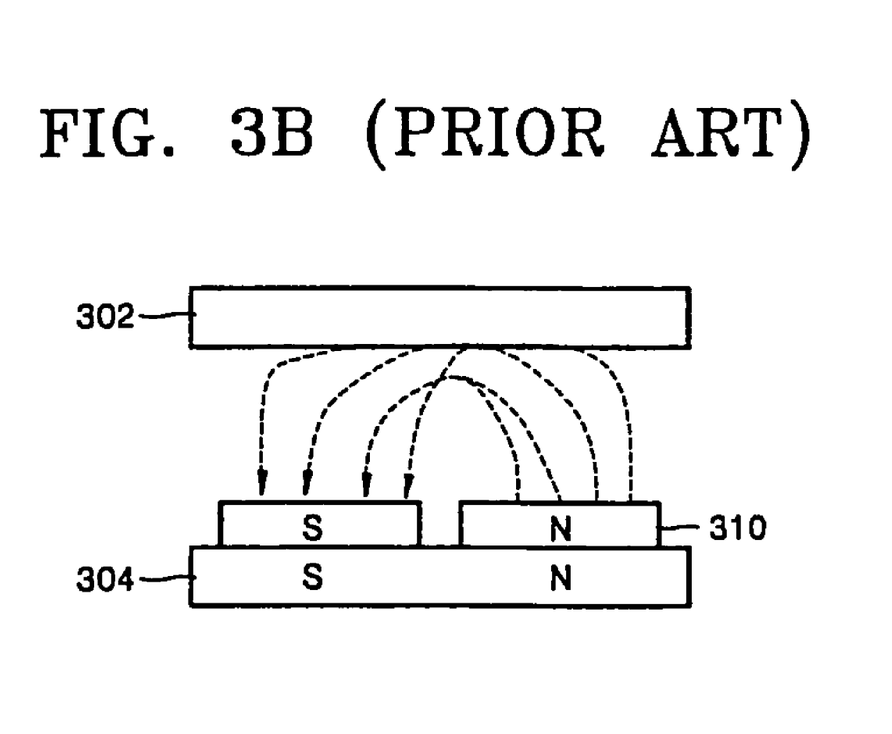

FIGS. 3A and 3B show yoke configurations of a multi-magnet VCM and a one magnet VCM, respectively. A VCM includes a yoke and a voice coil located in a magnetic field formed by fixed magnets of the yoke. An actuator is rotated by an interaction between a magnetic flux by the fixed magnets of the yoke and a magnetic flux by the voice coil. In a conventional method, the multi-magnet VCM (refer to FIG. 3A) in which two pairs of magnets 306 and 308 are deployed between upper and lower poles 302 and 304 of the yoke is mainly used. In FIG. 3A, a couple of magnetic fluxes are generated in opposite directions by the left and right magnets 306 and 308. Recently, to reduce costs, the one magnet VCM (refer to FIG. 3B) in which only a pair of magnets 310 is deployed between the upper and lower poles 302 and 304 has been used.

However, since the one magnet VCM uses only one pair of magnets 310, a distribution of a magnetic flux is not even as compared with that of the multi-magnet VCM.

As shown in FIG. 3A with arrows, in the multi-magnet VCM, a fixed magnetic field having a constant direction and an even magnetic flux density can be obtained. However, as shown in FIG. 3B with arrows, in the one magnet VCM, a fixed magnetic field relatively having a variable direction and a non-even magnetic flux density is obtained.

A non-even distribution of the magnetic flux density in the one magnet VCM affects a motion of an actuator. In particular, a phenomenon that an actuator vibrates with a specified frequency band (e.g., 700-900 Hz) in an inner disc zone of a disc has been observed.

Figure 4A:
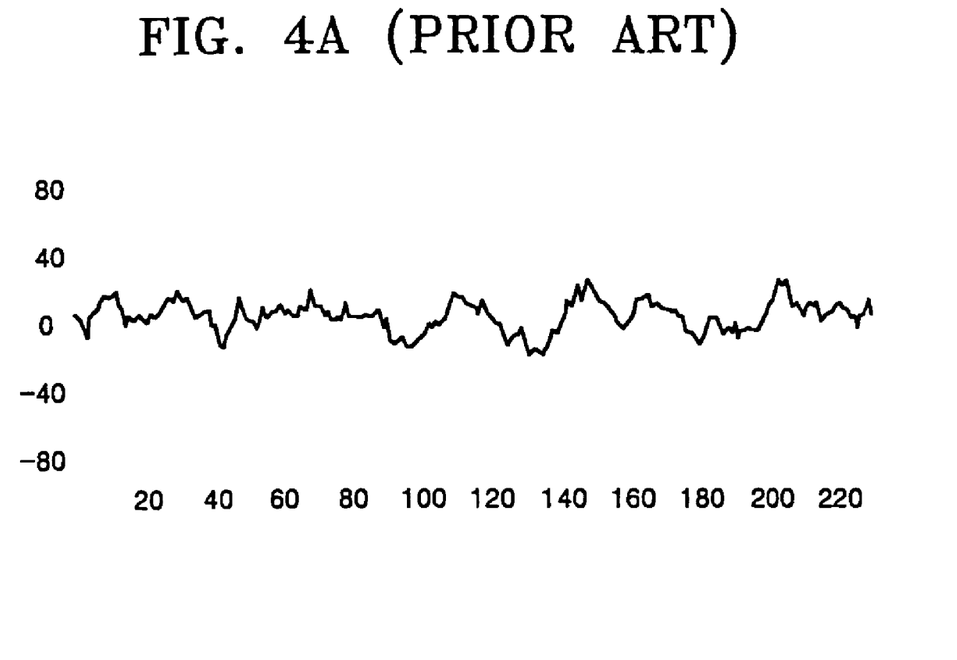
FIGS. 4A and 4B are graphs showing the magnitude and a frequency characteristic of a PES in a track following mode when an actuator vibration does not exist.
Figure 4B:
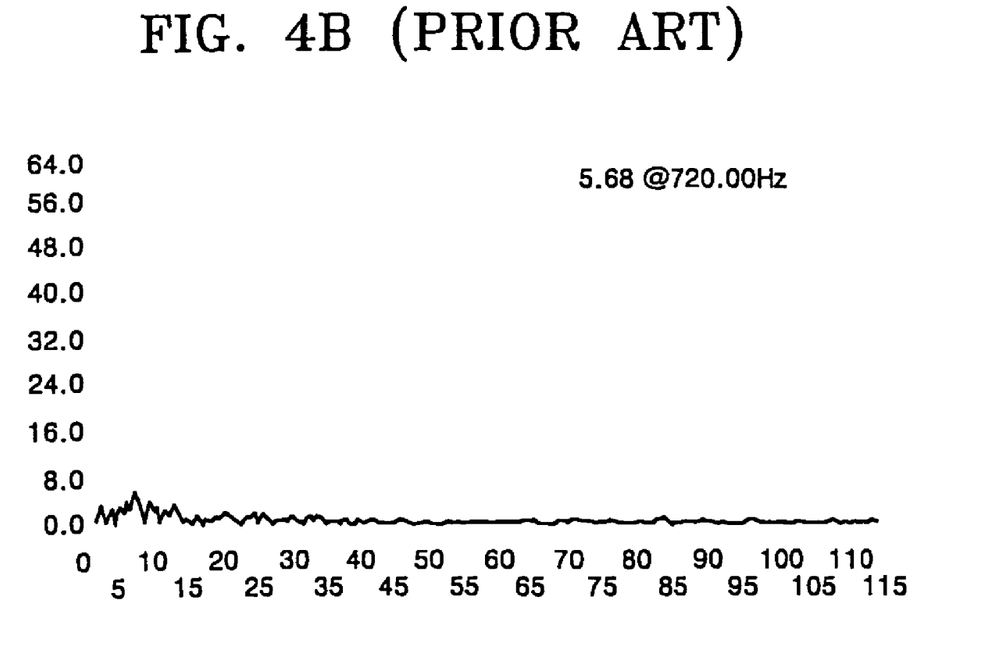

FIGS. 4A and 4B are graphs showing the magnitude and a frequency characteristic of a PES in a track following mode when actuator vibration does not exist. Referring to FIG. 4A, a vertical axis indicates the magnitude of an off-track, i.e., the magnitude of the PES, and a horizontal axis indicates a sector number. A position in which the magnitude of the PES is 0 indicates a center of a track. In a track following mode, a head drifts left and right with a variable pattern. The head drifts because a response characteristic of a tracking control circuit, an inertia of an actuator, and a bias conducted to the head.

Referring to FIG. 4B, a vertical axis indicates the magnitude per frequency, and a horizontal axis indicates a frequency. The frequency characteristic of the PES as shown in FIG. 4A is larger in the 700-900 Hz band than the other bands as shown in FIG. 4B. However, the magnitude is relatively insignificant. Referring to FIG. 4B, a maximum value 5.68 is obtained in 720 Hz.

Figure 5A:
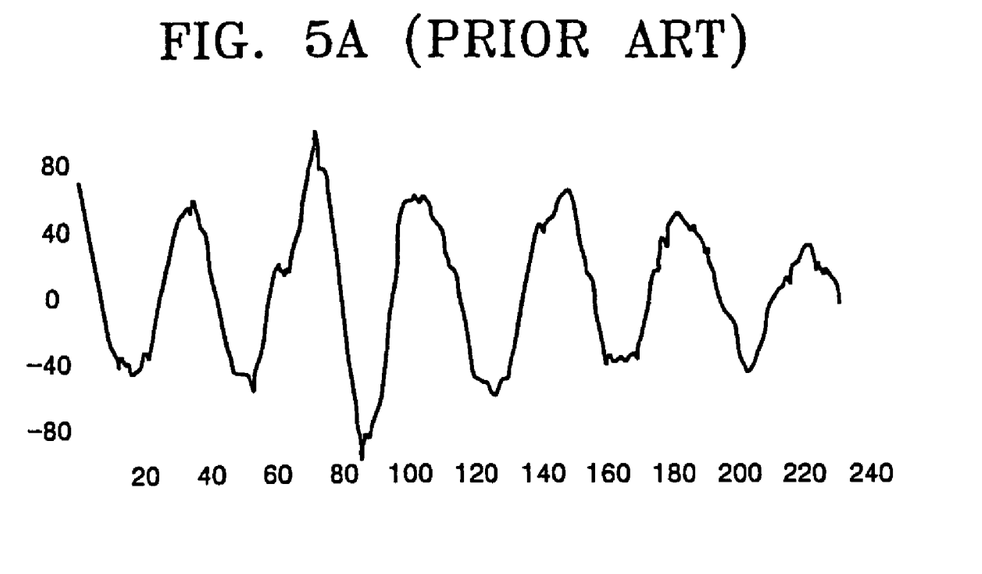
FIGS. 5A and 5B are graphs showing the magnitude and a frequency characteristic of a PES in a track following mode when an actuator vibration exists.
Figure 5B:
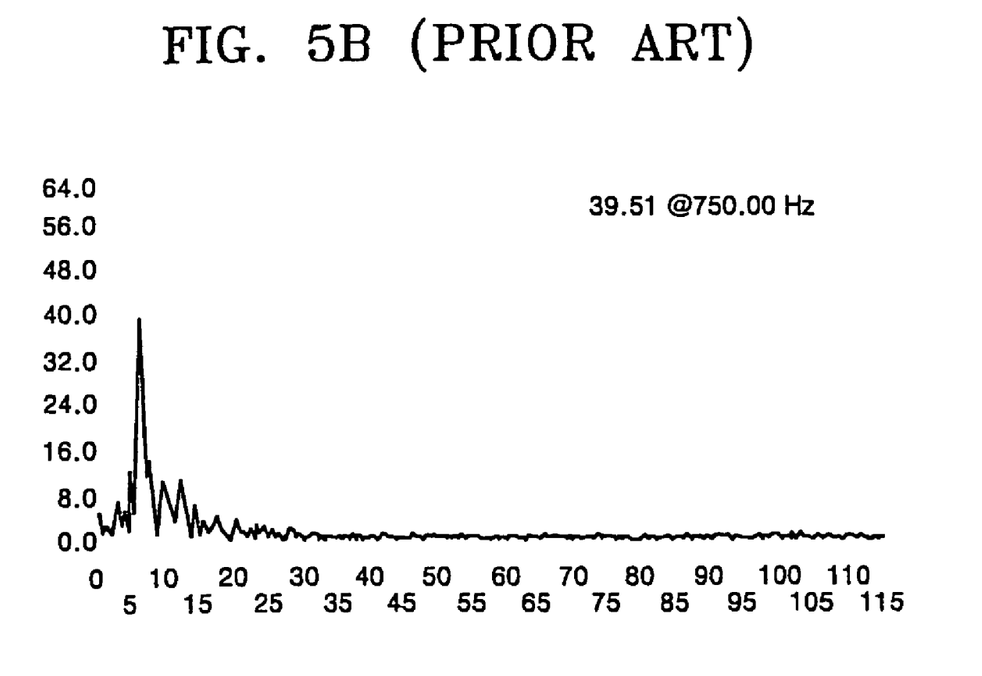

FIGS. 5A and 5B are graphs showing the magnitude and a frequency characteristic of a PES in a track following mode when actuator vibration exists. Referring to FIG. 5A, when there exists actuator vibration, even if it is a track following mode, a head vibrates left and right from a track center with a very large and constant pattern. Since the head is attached to the actuator, head vibration is caused by the actuator vibration.

The frequency characteristic of the PES as shown in FIG. 5A is much larger in the 700-900 Hx frequency band than the other bands as shown in FIG. 5B. Referring to FIG. 5B, a maximum value 39.51 is obtained in 750 Hz.

When the actuator vibrates, an off-track degree of the head is large as shown in FIG. 5A. Accordingly, a probability that a write operation is unstable is high. Also, if a write current is larger, a probability that a neighbor track erase effect is generated is also higher.

Figure 6:
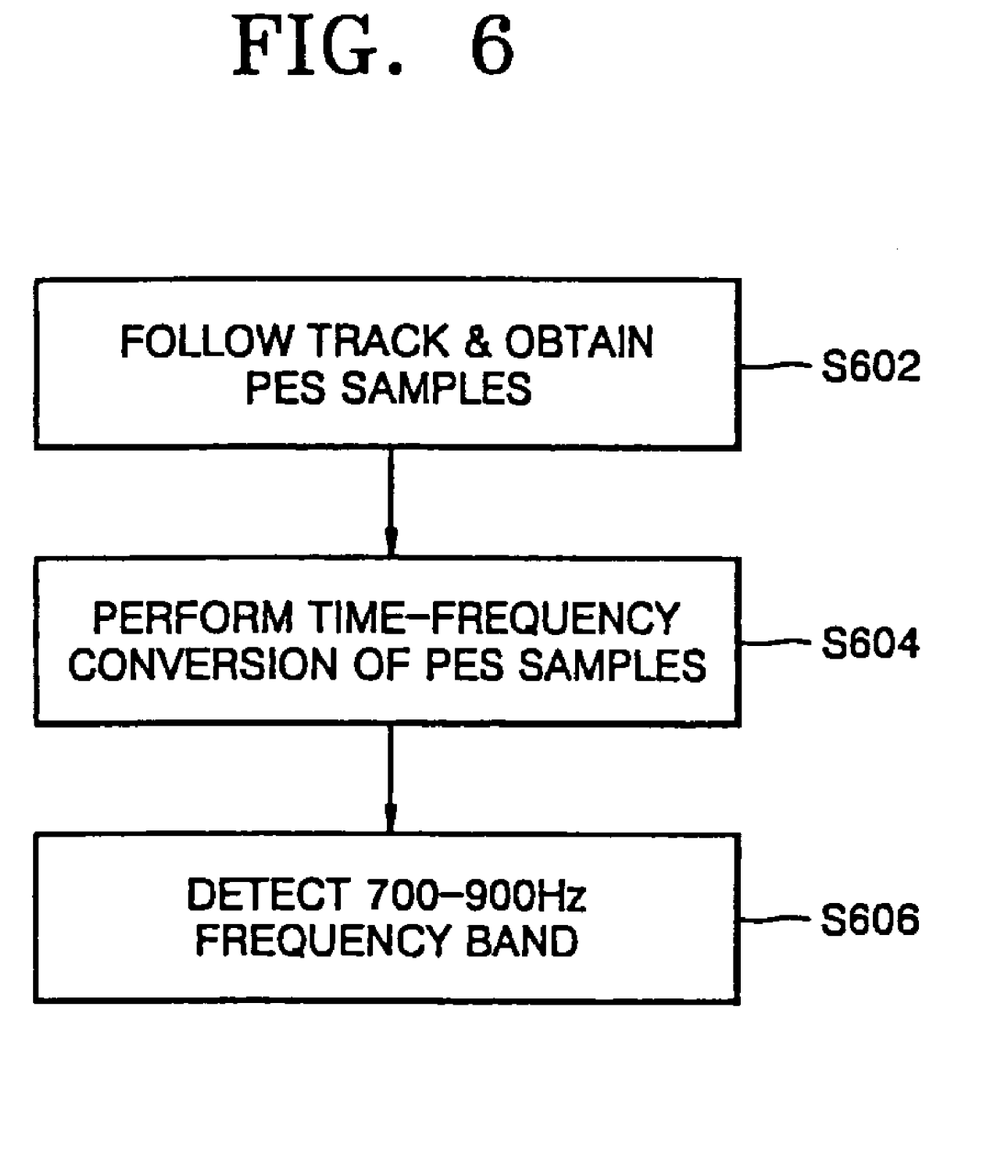
FIG. 6 is a flowchart of an actuator vibration detecting method according to an embodiment of the present invention.

FIG. 6 is a flowchart of an actuator vibration detecting method according to an embodiment of the present invention. In this embodiment, whether or not an actuator vibrates and the magnitude of the vibration is detected by sensing a frequency characteristic of a position error signal (PES). That is, the PES obtained when a head follows a track is sequentially sampled, and the frequency characteristics of a specified PES samples are examined.

The PES is obtained by a servo burst signal recorded on a servo sector. Even though there is a little difference, about 230 servo sectors exist in every track. Also, existence of the servo sector is recognized by a servo sync signal. A hard disc drive recognizes the existence of a servo sector by a servo sync signal, detects a servo burst signal in the servo sector, generates a PES corresponding to the magnitude of the detected servo burst signal. In reality, there exist 4 types (A, B, C, and D types) of servo burst signals, and a PES is obtained by comparing the magnitudes of the servo burst signals with each other.

First, while a track is followed, a specified number of PES samples are obtained in operation S602. That is, a specified number of PES samples are obtained by sequentially sampling PESs obtained while the head follows a track. The obtained PES samples indicate PESs in the time domain.

Frequency characteristics of the specified number of PES samples are examined in operation S604. The frequency characteristic is obtained by a time-frequency domain converting method such as a fast Fourier transform (FFT).

The magnitude of a conversion coefficient in a specified frequency band is detected in operation S606.

The magnitude of the conversion coefficient in the specified frequency band obtained in operation S606 indicates the magnitude of the actuator vibration. Here, even though a little bit deviation is shown in every hard disc drive, it is observed that the specified frequency band is 700-900 Hz.

Figure 7:
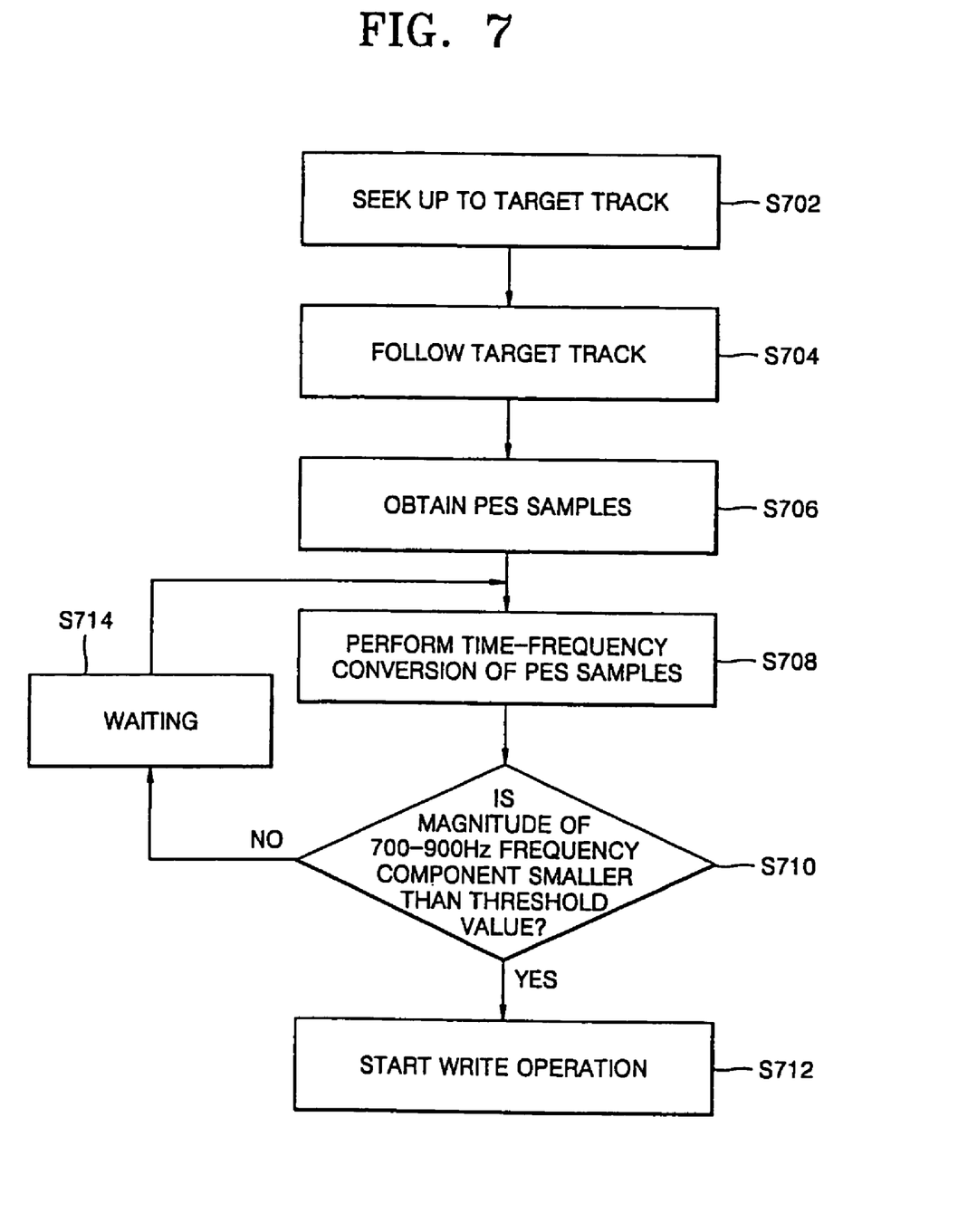
FIG. 7 is a flowchart of a write control method according to a first embodiment of the present invention.

FIG. 7 is a flowchart of a write control method according to a first embodiment of the present invention.

First, a seek is performed up to a target track on which a write operation is performed in operation S702.

If a head reaches the target track, the head follows the target track in operation S704.

PESs obtained while the head follows the target track are sequentially sampled in operation S706.

If the number of sampled PESs becomes a specified numbers N, frequency characteristics of the N PES samples are detected in operation S708.

Thereafter, the PES samples are time-frequency converted and the magnitude of a conversion coefficient in a specified frequency band is compared with a specified threshold value in operation S710.

If the magnitude of the conversion coefficient in the specified frequency band is smaller than the specified threshold value in operation S710, a write operation starts in operation S712. Here, even though a little bit deviation is shown in every hard disc drive, the specified frequency band is set to 700-900 Hz. A conversion coefficient having a maximum value among conversion coefficients existing in the band ranged 700-900 Hz band is selected.

If the magnitude of the conversion coefficient in the specified frequency band is larger than the specified threshold value in operation S710, the head waits during a specified time in operation S714.

By returning to operation S708, frequency characteristics of new N PES samples are detected. For example, it is assumed that the PES samples obtained while the head follows the target track are PES_1, PES_2, . . . , PES_N, PES_(N+1), . . . . If frequency characteristics of PES samples, such as PES_1, PES_2, . . . , and PES_N, were detected in the first place, frequency characteristics of PES samples, such as PES_2, . . . , PES_N, and PES_(N+1), are detected in the next place. Securing PES samples as many as numbers required for detecting a frequency characteristic is achieved by buffering the PES samples. That is, by buffering PES samples obtained while the head follows the target track in a first-in-first-out (FIFO) buffer that can buffer N PES samples, it is possible that new N PES samples are always supplied by discarding an oldest PES sample and replacing a new PES sample whenever a PES sample is input.

The waiting and buffering operation indicates that the write operation is reserved during one PES sample, i.e., one servo sector time. That is, since the actuator vibration is attenuated in time, in the write control method according to the first embodiment of the present invention, when the actuator vibration is larger than the threshold value, the write operation is not performed, and only when the actuator vibration is smaller than the threshold value, the write operation is performed.

By the operations described above, instability of the write operation due to the actuator vibration or the neighbor track erase effect can be avoided.

The actuator vibrates according to a position of a disc and a seek distance. In other words, the actuator vibrates mainly when the head is in specific positions in an inner disc zone.

Therefore, the write operation may be controlled according to a critical position and a critical seek distance when the actuator starts vibrating.

Figure 8:
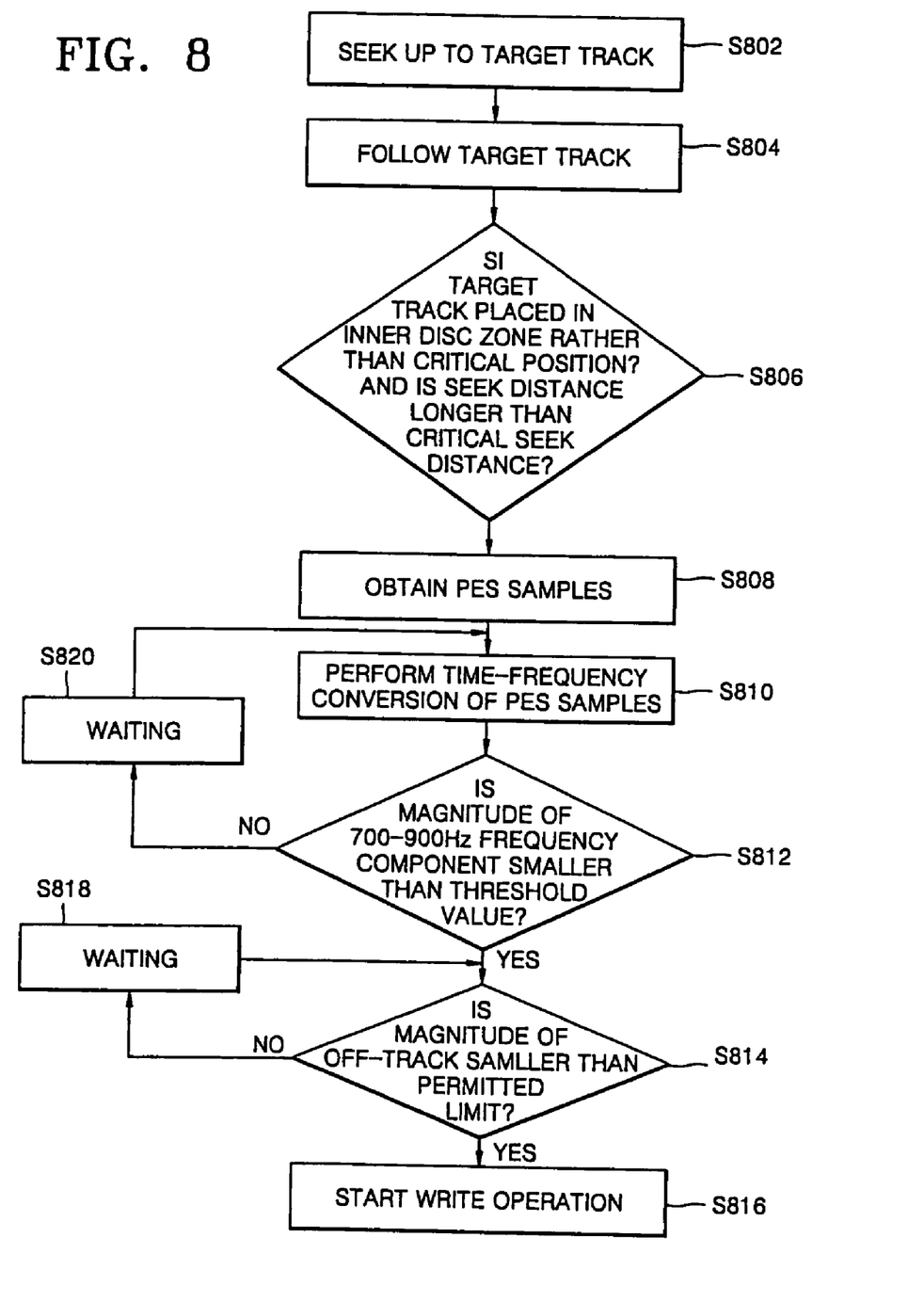
FIG. 8 is a flowchart of a write control method according to a second embodiment of the present invention.

FIG. 8 is a flowchart of a write control method according to a second embodiment of the present invention.

First, a seek operation is performed up to a target track on which a write operation is performed in operation S802.

If a head reaches the target track, the head follows the target track in operation S804.

It is determined whether the target track is placed in an inner zone of a critical position and whether a seek distance up to the target track is longer than a critical seek distance in operation S806.

If the target track is placed in an inner zone of a critical position and a seek distance up to the target track is longer than a critical seek distance in operation S806, PESs obtained while the head follows the target track are sequentially sampled in operation S808.

If the number of sampled PESs reaches a specified number N, frequency characteristics of the N PES samples are detected in operation S810.

Thereafter, the PES samples are time-frequency converted and the magnitude of a conversion coefficient in a specified frequency band is compared with a specified threshold value in operation S812.

If the magnitude of the conversion coefficient in the specified frequency band is equal to or smaller than the specified threshold value in operation S812, operation S814 is performed.

It is examined whether the magnitude of an off-track is within a permitted limit in operation S814.

If the magnitude of an off-track is within a permitted limit in operation S814, the write operation starts in operation S816. Otherwise, after the head waits during a specified time in operation S818, operation S814 is repeated.

If the magnitude of the conversion coefficient in the specified frequency band is larger than the specified threshold value in operation S812, after the head waits during a specified time in operation S820, frequency characteristics of new N PES samples are detected by returning to S810.

The critical position and the critical seek distance are examined in a manufacturing process of hard disc drives.

The critical position is placed near the inner disc zone of a disc. To obtain the critical position, a certain track (for example, the outermost track) located on the outer disc zone is set to a position in which a seek starts, and the seek is performed while a position of a target track gradually moves to the outer circumference, and if a head reaches the target track, it is examined whether actuator vibration is generated by detecting a 700-900 Hz frequency component while the head follows the target track. A position in which the actuator starts vibrating is the critical position.

Until the critical position, the target track is gradually moved to the innermost track, the Mth track from the innermost track, and the 2Mth track from the innermost track.

If the critical position is determined, the critical position is set to the target track, and it is examined whether the actuator vibration is generated by performing a seek operation while the seek operation starts from an outer position of the critical position and the starting position is gradually moved to the outermost circumference, that is, while a seek distance is getting larger. A seek distance in which the actuator vibration starts to be generated as the examination result is the critical seek distance.

Figure 9:
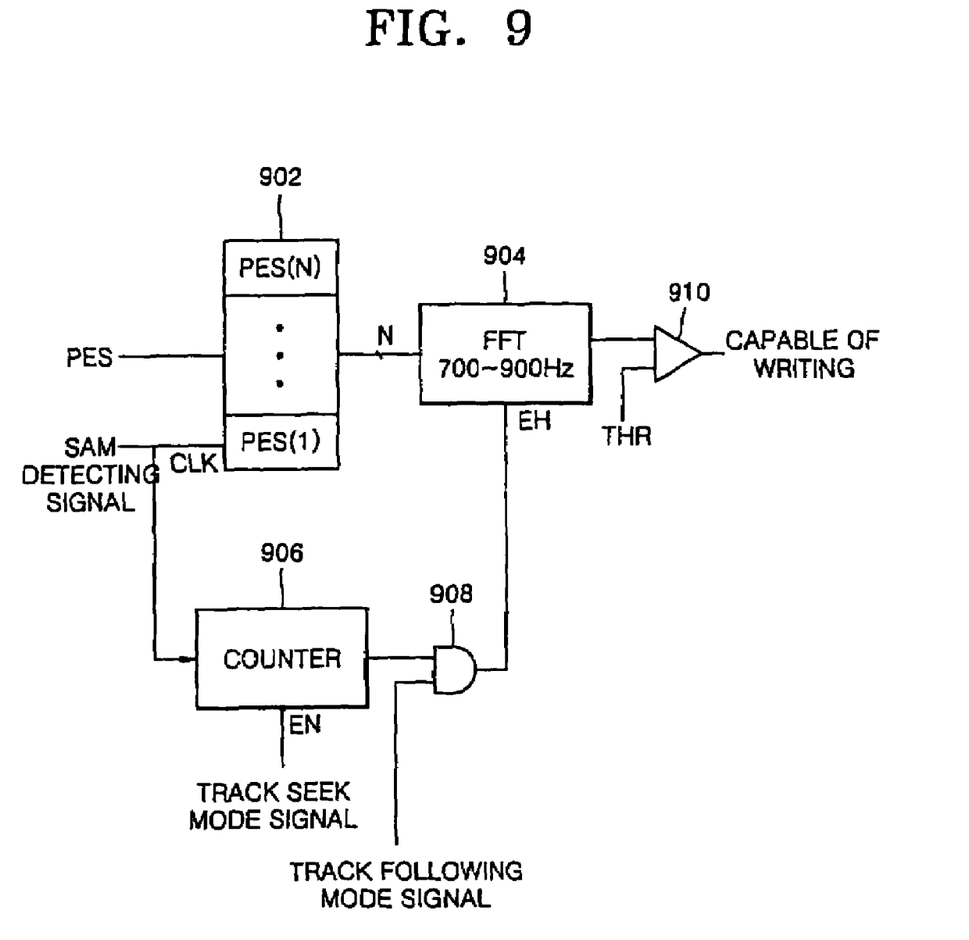
FIG. 9 is a block diagram of an actuator vibration detecting apparatus according to an embodiment of the present invention.

FIG. 9 is a block diagram of an actuator vibration detecting apparatus according to an embodiment of the present invention. Referring to the apparatus includes a first in first out FIFO buffer 902 buffering N PES samples obtained during following a track and a fast Fourier transformer 904 performing an FFT of the N PES samples provided by the FIFO buffer 902 and outputting the magnitude of a 700-900 Hz frequency component.

Also, the apparatus may also include a counter 906 detecting that the N PES samples are buffered in the FIFO buffer 902 and an AND gate 908 generating a signal enabling the fast Fourier transformer 904 by AND operating a counted result of the counter 906 and a track following mode signal. The counter 906 counts a servo address mark detecting signal. The servo address mark exists in every servo sector, and since the PES is generated from every servo sector, the servo address mark detecting signal can indicate that a PES sample is generated. Also, a track seek mode signal clearing a count result when a track seek operation is performed is provided to the counter 906.

A comparator 910 compares the magnitude of the 700-900 Hz frequency components provided by the fast Fourier transformer 904 with a specified threshold value (THR). The comparison result of the comparator 910 indicates whether the actuator vibration is within a permitted limit, that is, whether a write operation can be performed.

As described above, since the actuator vibration detecting apparatus according to an embodiment of the present invention can detect the magnitude of actuator vibration and whether a write operation can be performed, if the apparatus is used for hard disc drives, instability of the write operation and a neighbor track erase effect can be avoided.

Also, while embodiments of the present invention have been particularly shown and described with reference to a hard disc drive, it is to be understood that the present invention may be adapted to an optical disc drive and an optical magnetic disc drive.

Embodiments of the present invention can be realized as a method, an apparatus, and/or a system. When embodiments of the present invention are realized as software, components of the present invention are embodied as code segments for executing required operations. A program or the code segments can be stored in a processor readable recording medium and transmitted as computer data signals combined with a carrier using a transmission medium or a communication network. The processor readable recording medium is any data storage device that can store or transmit data which can be thereafter read by a computer system. Examples of the processor readable recording medium include electronic circuits, semiconductor memory devices, read-only memory (ROM), flash memory, erasable ROM, floppy disks, optical discs, hard discs, optical fiber media, and RF networks. The computer data signals include any signal which can be propagated via transmission media such as electronic network channels, optical fibers, air, electronic fields, and RF networks.

As described above, a write control method according to an embodiment of the present invention can allow instability of a write operation and a neighbor track erase effect to be avoided by controlling the write operation according to the magnitude of actuator vibration.

Also, since a vibration detecting apparatus according to an embodiment of the present invention can detect the magnitude of the actuator vibration and whether the write operation can be performed, if the apparatus is used for hard disc drives, instability of the write operation and the neighbor track erase effect can be avoided.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

What is claimed is:

1. A method of controlling a write operation of a hard disc drive, the method comprising:
    seeking a target track to perform the write operation;
    following the target track when the target track is reached;
    sequentially sampling position error signals (PES) obtained during the following;
    time-frequency converting the PES samples;
    comparing a magnitude of a conversion coefficient in a specified frequency band and a specified threshold value; and
    writing, when the magnitude of the conversion coefficient in the specified frequency band is smaller than the specified threshold value.

2. The method of claim 1, further comprising:
    waiting, when the magnitude of the conversion coefficient in the specified frequency band is smaller than the specified threshold value, for a specified time and performing the time-frequency converting again.

3. The method of claim 1, wherein the specified frequency band is 700-900 Hz.

4. The method of claim 1, wherein the writing is controlled according to a critical position and a critical seek distance, the critical position being a position at which the actuator starts vibrating, the critical seek distance being a seek distance in which the actuator vibration starts vibrating.

5. The method of claim 1, further comprising:
    determining, before the sampling, whether the target track is placed in an inner disc zone rather than a threshold position in which the actuator vibration starts, and when the target track is in an inner disc zone, performing the time-frequency converting and the comparing.

6. The method of claim 1, further comprising:
    determining, before the sampling, whether the target track is placed in an inner disc zone rather than a threshold position in which the actuator vibration starts and whether a seek distance to the target track is longer than a threshold seek distance in which the actuator vibration starts, and when the target rack is in an inner disc zone and the seek track is longer than the threshold seek distance, performing the time-frequency converting and the comparing.

7. A method of preventing instability of a write operation, comprising:
    obtaining a specified number of position error signal (PES) samples while following a track;
    time-frequency converting the specified number of PES samples; and
    detecting a magnitude of a conversion coefficient indicating a magnitude of an actuator vibration, in a specified frequency band.

8. A method of preventing a neighbor track erase effect during a write operation, comprising:
    obtaining a specified number of position error signal (PES) samples while following a track;
    time-frequency converting the specified number of PES samples; and
    detecting a magnitude of a conversion coefficient indicating a magnitude of an actuator vibration, in a specified frequency band.

9. A computer-readable storage medium encoded with processing instructions for causing a processor to perform a method of controlling a write operation of a hard disc drive, the method comprising:
    seeking a target track to perform the write operation;
    following the target track when the target track is reached;
    sequentially sampling position error signals (PES) obtained during the following;
    time-frequency converting the PES samples;
    comparing a magnitude of a conversion coefficient in a specified frequency band and a specified threshold value; and
    writing, when the magnitude of the conversion coefficient in the specified frequency band is smaller than the specified threshold value.

* * * * *